(12) United States Patent
Ruttenberg et al.

(10) Patent No.: US 7,760,804 B2
(45) Date of Patent: Jul. 20, 2010

(54) EFFICIENT USE OF A RENDER CACHE

(75) Inventors: Brian E. Ruttenberg, Sacramento, CA (US); Prasoonkumar Surti, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1794 days.

(21) Appl. No.: 10/873,684

(22) Filed: Jun. 21, 2004

(65) Prior Publication Data

US 2006/0001663 A1      Jan. 5, 2006

(51) Int. Cl.
  *H04N 7/12*    (2006.01)
  *G09G 5/36*    (2006.01)

(52) U.S. Cl. .................... 375/240.12; 345/557
(58) Field of Classification Search ............ 345/531, 345/540, 542, 552, 557, 611; 348/222.1; 709/247; 375/240.12; 711/136, 153
See application file for complete search history.

(56) References Cited

U.S. PATENT DOCUMENTS

| 5,467,459 | A | * | 11/1995 | Alexander et al. | 711/153 |
| 5,680,161 | A | * | 10/1997 | Lehman et al. | 345/531 |
| 5,696,945 | A | * | 12/1997 | Seiler et al. | 345/540 |
| 5,774,676 | A | * | 6/1998 | Stearns et al. | 709/247 |
| 6,496,193 | B1 | | 12/2002 | Surti et al. | |
| 6,538,650 | B1 | | 3/2003 | Prasoonkumar et al. | |
| 6,823,427 | B1 | * | 11/2004 | Sander et al. | 711/136 |
| 6,958,757 | B2 | * | 10/2005 | Karlov | 345/557 |
| 6,961,085 | B2 | * | 11/2005 | Sasaki | 348/222.1 |
| 7,050,061 | B1 | * | 5/2006 | Baldwin | 345/552 |
| 2004/0174378 | A1 | * | 9/2004 | Deering | 345/611 |
| 2005/0219252 | A1 | * | 10/2005 | Buxton et al. | 345/542 |

OTHER PUBLICATIONS

"Zone Rendering—Whitepaper", Intel Corp., May 2002, Document No. 298587-001 (pp. 1-15).
"Intel® 865G/865GV Chipset—Datasheet" Intel 8285G/82865GV Graphics and Memory Controller Hub (GMCH), Intel Corp., Feb. 6, 2004, Document No. 25214-005 (pp. 1-24; and Chapter 5—Functional Description pp. 147-183).

* cited by examiner

*Primary Examiner*—Gims S Philippe
(74) *Attorney, Agent, or Firm*—Blakely, Sokoloff, Taylor & Zafman LLP

(57) ABSTRACT

Image data is processed into first and second component pixel blocks, where each of the first blocks is associated with a respective one of the second blocks to define a combination pixel block. The first and second blocks are written to memory through a cache that is used as a write buffer. The cache is logically partitioned into a contiguous portion to store the first blocks and not any second blocks, and another contiguous portion to store the second blocks and not any first blocks. Other embodiments are also described and claimed.

38 Claims, 11 Drawing Sheets

EFFICIENT USE OF A RENDER CACHE

BACKGROUND

An embodiment of the invention is related to digital image processing and the use of a render cache as a buffer when writing image data to main memory. Other embodiments are also described.

In digital image processing, natural scenes and artificially created ones (such as those created by computer graphics systems) are represented by digital images. An image includes a collection of picture elements (pixels) each of which is a set of numbers that may represent the intensity and/or color of a particular location on a display screen. For example, in the so called YUV color space, each pixel is defined as a combination having a Y component representing luminance, and a pair of U and V components representing color. A typical digital image may have upwards of one million pixels. To display an image, each pixel is translated into control signals that are then applied to activate a corresponding location of a display screen. In the case of video, a sequence of images or frames are rapidly processed and displayed sequentially at a high enough rate (e.g., greater than 20 frames per second) to show motion in the scene.

Current applications of digital image processing place a heavy demand on the constituent hardware and software. This is in part due to the large amount of image data called for by higher resolution images, and due to the complex digital processing algorithms that are applied to them. For example, in the case of a digital video disc (DVD) movie, a video stream has been compressed into a relatively small file that is stored on the disc. To play back the movie, a DVD player or desktop computer decodes this compressed file, to reconstruct the video stream. To avoid skipped frames in the playback, which lead to undesirable visual artifacts, the reconstructed video images should be generated within predetermined time intervals so that the video images are ready in time to be applied to the display screen. This places an even greater demand on the hardware and software, particularly at higher frame rates or image resolutions.

A typical hardware/software platform for digital image processing may be a personal computer, or other electronic system, that has the following primary hardware components: a central processing unit (CPU) or host processor, such as a PENTIUM processor by Intel Corp., Santa Clara, Calif.; a graphics controller, such as one that is integrated within and is a display adapter component of a system chipset (e.g., the 865G chipset by Intel Corp.); and main memory (also referred to as system memory) composed of for example dynamic random access memory (DRAM). The graphics controller is a specialized integrated circuit that performs various types of compute-intensive digital image processing upon image data.

The software may be loaded into main memory once the system has been booted, to be executed by the host processor. This software may include an application program such as DVD player software, an operating system program, and a device driver that is used by the application program for accessing hardware registers of the graphics controller. Once the hardware has been configured by the operating system and driver, the application program can execute.

When executing DVD player software, for example, part or all of a compressed movie file (e.g., in motion picture experts group, MPEG, format) is first loaded into main memory. The software and the compressed movie file provide instructions to the host processor and the graphics controller (translated by the device driver and operating system) for decoding the movie file. Much of the decoding task is typically performed by a specialized hardware video engine in the graphics controller, for greater speed of execution. The video engine generates the reconstructed frame or image in chunks, where each chunk is known as a pixel macroblock (or simply pixel block). An example of a pixel block is a square of 16×16 contiguous pixels. The stream of pixel blocks is written to main memory where it is stored, pending further processing by a display engine in the graphics controller. The display engine may perform further digital image processing such as color shading of the pixel blocks. The pixel blocks are then eventually translated into control signals that are then applied to activate corresponding locations of a display screen.

As mentioned above, the processing and display of video is time sensitive, i.e. has real-time requirements such as a minimum frame rate. For example, a popular video requirement is 60 frames per second, such that there is about 16 milliseconds to complete the definition of the pixel blocks of each frame before the frame is applied to the display screen. To help meet such requirements, it is considered good practice to avoid stalling the video engine so that there is a steady flow of pixel blocks at its output. A fast but small storage device known as a render cache is used for buffering the output of the video engine.

The render cache is typically integrated within the graphics controller, and is used by other image processing tasks (such as rendering 2D and 3D graphics) as a buffer for temporary storage of a small amount of recently accessed image data that is being processed by the graphics controller. To give an idea of the relative storage size at issue here, a typical render cache can store 8 kilobytes (KB) whereas each frame is typically more than 1 megabyte (MB), and main memory has hundreds of megabytes of storage. The render cache is situated in a data path between the video engine and the main memory, and can thus be used as a buffer through which the pixel blocks decoded by the video engine are written to memory.

The organization of image data as it is stored in main memory, to be used by the display engine, is typically dictated by the operating system. In practice, an application program requests the operating system to allocate a certain amount storage space to it, for storing the pixel blocks that will be displayed. The operating system responds by returning a set of addresses that point to the allocated space. These addresses are then used to instruct the graphics controller where to transfer the pixel blocks from the render cache.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

At least two methodologies that make more efficient use of a render cache as a write buffer when writing image data to main memory are described. These involve different ways of logically partitioning the render cache so as to make more efficient use of the bandwidth available between the cache and memory.

Figure 1:
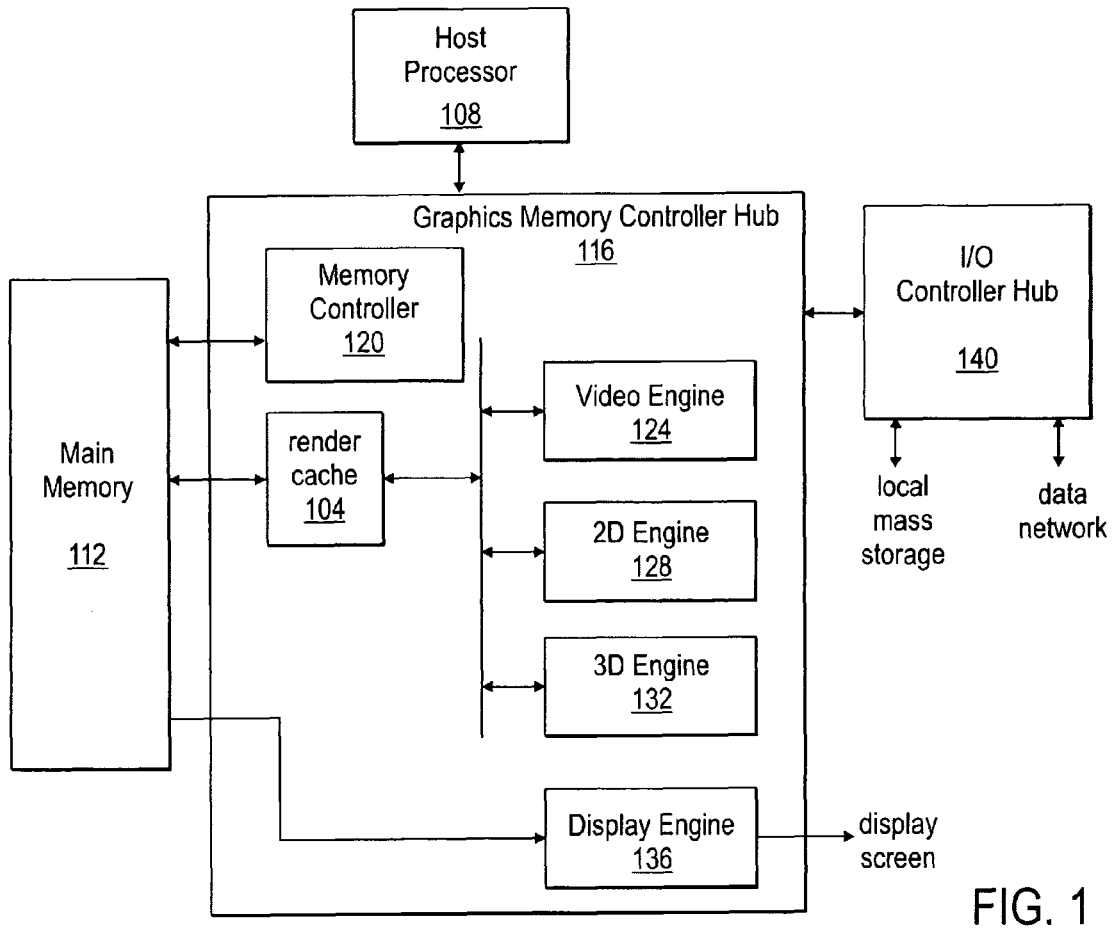
FIG. 1 is a block diagram of a system for image processing that can benefit from more efficient use of the render cache.

Beginning with FIG. 1, a block diagram of a system for image processing is described that can benefit from more efficient use of a render cache 104. The illustrated hardware platform has a host processor or CPU 108, main memory 112 that may consist of, for example, DRAM, and a graphics memory controller hub (GMCH) 116. The CMCH 116 has a memory controller 120 that may be configured to support different types of DRAM devices, depending on the desired system configuration. The memory controller may also support different modes of operation, including special addressing modes, such as tiled mode which is aimed at improving the performance of the integrated graphics controller.

The integrated graphics controller or accelerator is composed of the render cache 104, a video engine 124, two-dimensional processing (2D) engine 128, three-dimensional processing (3D) engine 132, and display engine 136. The 2D engine 128 may implement two-dimensional graphics processing functionality, such as the stretch block level transfer (BLT) function which stretches source data in X and Y directions to a destination larger or smaller than the source. Another part of the graphics controller, in this embodiment, is the 3D engine 132, whose functionality may include texture mapping to the surface of a 3D polygon, and scan conversion which takes vertex and edge information. The final color of a pixel may be calculated by the display engine 136, including the application of such color processing as fogging, specular red, green, and blue color processing (RGB), and texture map blending. The final pixel values which may sometimes be in the RGB color space may then be further processed into control signals that are applied to activate the pixel locations of a display screen.

The GMCH 116 also has a video engine 124 that is to process digital video as follows. One aspect of the video engine 124 is a hardware motion compensation process that reconstructs a new picture or image frame, by predicting either forward, backward, or bi-directionally, the resulting pixel values (colors) for one or more reference pictures. For example, DVD player software being executed by the host processor 108 provides the video engine 124 with a compressed data sequence, as well as instructions for decompressing or decoding the sequence into a sequence of pictures. The video engine 124 may essentially replace software-based MPEG 2 decoding, and thereby improving system performance. Other capabilities of the video engine 124 may include subpicture support for DVD by mixing two video streams via alpha blending where one of the streams defines the subtitles for movie captions.

Finally, the system in FIG. 1 may also have an I/O controller hub 140 that manages transfers of image data between host processor 108/memory 112 and either local mass storage (such as a magnetic hard disc drive) and a data network (e.g., the Internet).

Figure 2:
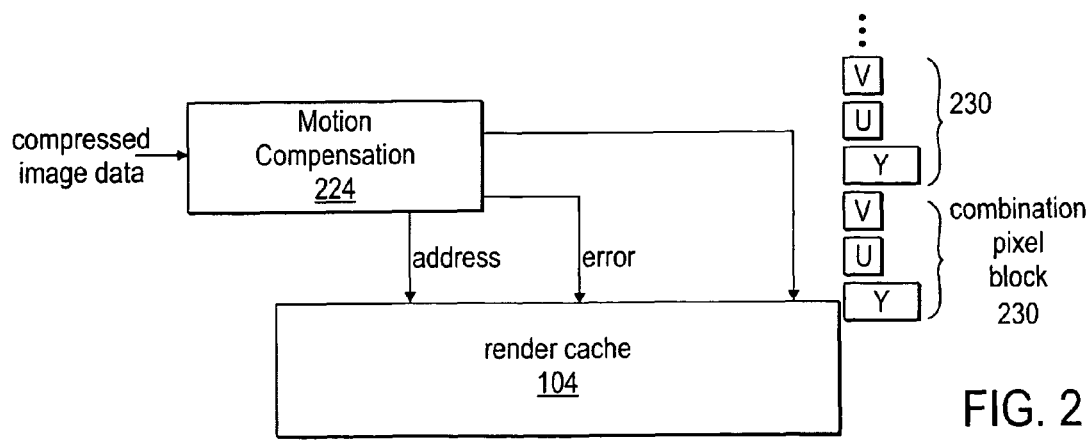
FIG. 2 illustrates a detailed block diagram focusing on the video engine and render cache.

A more detailed block diagram focusing on the video engine 124 and render cache 104 is shown in FIG. 2. As introduced above, the video engine 124 may have a hardware motion compensation unit 224 that takes as input compressed image data and provides at its output a sequence of combination pixel blocks 230 for a new frame. This is also referred to as rendering an image or a frame in pieces. Each combination pixel block 230 may be associated with one or more address values that are provided to the render cache 104. The render cache 104 may be used in this example as essentially a write buffer, where blocks written to the cache are not then read again from the cache by either the video engine 124 or the display engine 136. Rather, blocks that have been written to the cache are then eventually transferred to main memory 112 before being processed by the display engine 136 (see FIG. 1). In practice, one or more address values provided by the motion compensation unit 224 (which address has been assigned by the host processor executing a higher level software application, for example, a DVD player), are followed by their corresponding combination pixel block 230.

The render cache 104 is organized as cache lines, where a predefined range or block of addresses in main memory 112 have been mapped to a given cache line. The cache may be arranged as cache lines, with a mapping function that may restrict where, i.e. in which cache lines, a memory block is placed. For example, each memory block may be allowed to appear in only one place of the cache. This is referred to as a direct-mapped cache. If a block can be placed anywhere in the cache, the cache is said to be fully associative. If a block can be placed in a restricted number of places, the cache is said to be set associative. A set may be a group of cache lines; a block is first mapped into a set, and then it typically can be placed anywhere within that set. If there are n blocks in a set, the cache placement is called n-way set associative.

The render cache 104 may also be used to temporarily store error data that results from the motion compensation algorithm, where this error data is then also to be written to the main memory 112.

The cache 104 may be emptied to main memory 112 in one of at least two ways. One possible technique is a cache flush, where at the end of rendering an image or a frame, the host processor, as programmed in accordance with its application software, instructs the cache to write all of the image data that it is currently storing to main memory. This is done so that the entire frame may then be displayed.

Another technique for emptying the cache is referred to as eviction. This occurs when the video engine seeks to write a particular address that happens to map onto one or more cache lines that are considered to be in use by other pixel blocks. In that case, the new address from the video engine will cause the contents of the one or more cache lines to which the new address has been mapped to be written out of the cache and to a location in main memory (given by that address), to make room for the new request. That is because the cache is being used as a write buffer, and the output of the video engine should not be stalled so as to maintain adequate performance of video display. According to an embodiment of the invention, such evictions or writes to main memory from the render cache are improved upon, in that the amount of pixel data that is stored in the cache line that is about to be evicted is increased. In this way, the methodology takes advantage of all of the available bandwidth between the render cache and main memory, where, for example, in the case of a cache line that is 64-bytes, the entire 64-bytes contain valid pixel data when the cache line is evicted.

According to an embodiment of the invention, a combination pixel block (macroblock) is defined as having at least a first component and a second component. For example, in the case of a YUV pixel block, each would be defined as having three components, namely a Y block, U block, and V block. The render cache is logically partitioned into at least two portions, each being contiguous, i.e. the cache lines that make up a portion are connected throughout that portion in an unbroken sequence of cache set addresses. One contiguous portion is for storing the first component pixel blocks, but not any second component ones. Another contiguous portion is for storing second component pixel blocks but not any first component ones.

To illustrate the problem of efficiency discovered with respect to the render cache, the following example will be used in connection with FIGS. 3 and 4A-4C. This will be followed by an example of a logically partitioned cache according to an embodiment of the invention for the case of YUV rendering, in FIGS. 5-9. Now, assume the render cache 104 has an 8 KB section of storage divided into 64 cache lines of 128B each. In the case where each transfer cycle from cache to memory 112 is 64B, two cycles are needed to transfer an entire cache line. If there is less than 128B of valid data in a cache line, then the unused bandwidth during the transfer of that line to memory has in effect been wasted.

Figure 3:
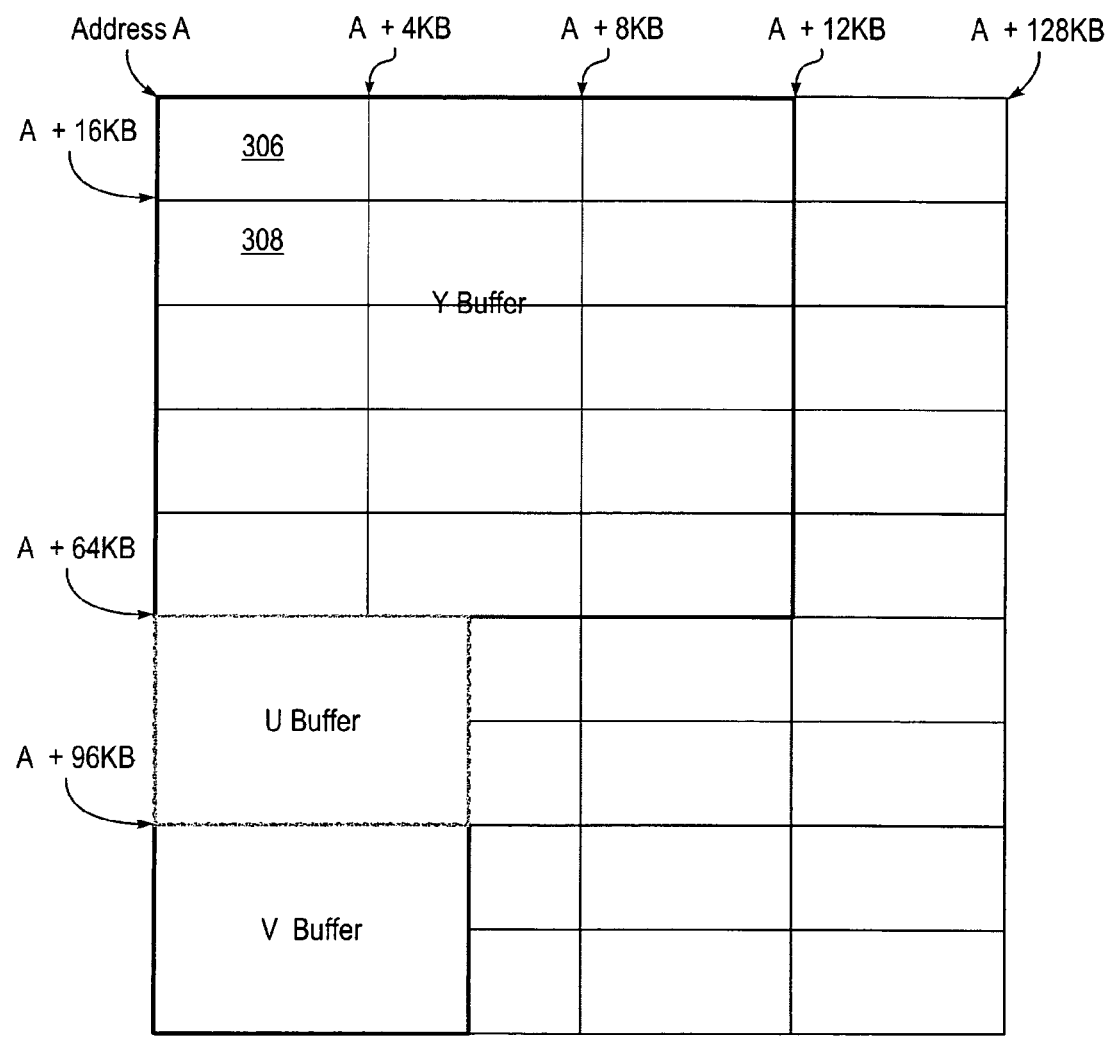
FIG. 3 depicts a rectangular area of memory (buffer) for storing pixel blocks.

The render cache 104 as used in most display applications is configured (via the operating system) with a tiled view of main memory 112. This is depicted in FIG. 3. The pixels for the display screen are placed into "rectangular" regions of memory called tiles 306, 308. The pixels in each tile are assigned addresses that are contiguous within that tile, i.e. they form an uninterrupted sequence within that tile. However, there may be an address discontinuity (also referred to as a gap or jump) from one tile to the next adjacent one. For example, in FIG. 3, although tile 306 starting at address A and being 4 KB is adjacent to tile 308, the latter starts at A+16 KB. Similarly, the next adjacent Y buffer (not shown), despite being deemed "horizontally adjacent" to the Y buffer being shown, does not start at address A+60, which is the end of the Y buffer, but rather at A+128 KB.

Figure 4A:
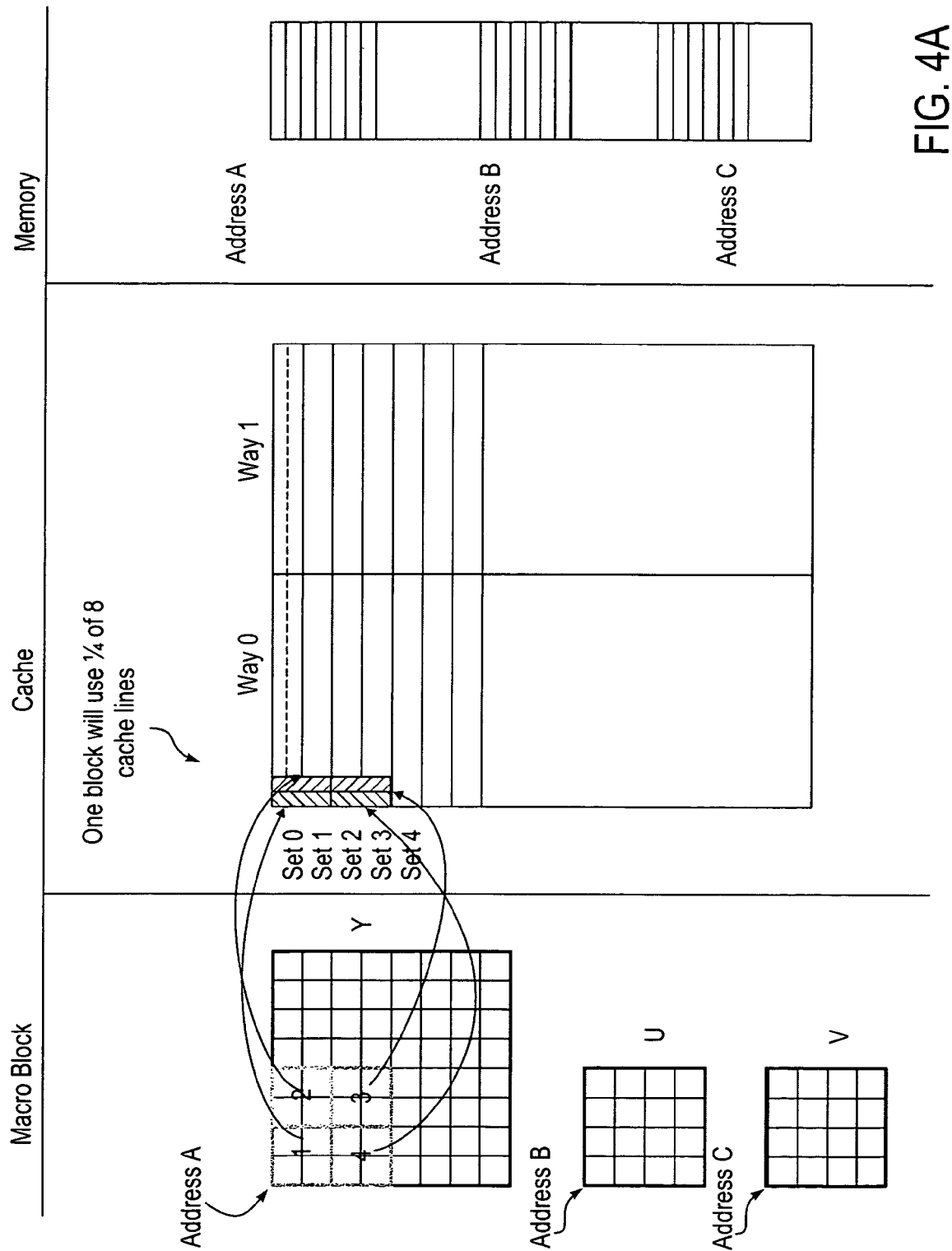
FIGS. 4A-4C illustrate a cache set address mapping function that may be used for buffering image data in a render cache.

As explained above, the video engine 124 repeatedly sends requests to write the render cache 104 with a pixel block, such as during play back of a compressed video file. These requests may first provide one or more addresses for a combination pixel block, followed by the actual content of that block. Based upon an address mapping function that may be either fixed during manufacture of the graphics controller, or configured/programmed by the operating system, the address of a pixel block is translated to a cache set address which points to one or more 128B cache lines. This is depicted in FIG. 4A. In this example, a single combination pixel block or macro block is illustrated that has a U component, Y component, and a V component. The Y component is stored in memory beginning at address A, while the U and V components are stored at respective addresses beginning at B and C. Note that due to the tiled nature of image data as stored in memory by digital image processing applications, there are large address gaps between addresses A and B, and between B and C.

Figure 4B:
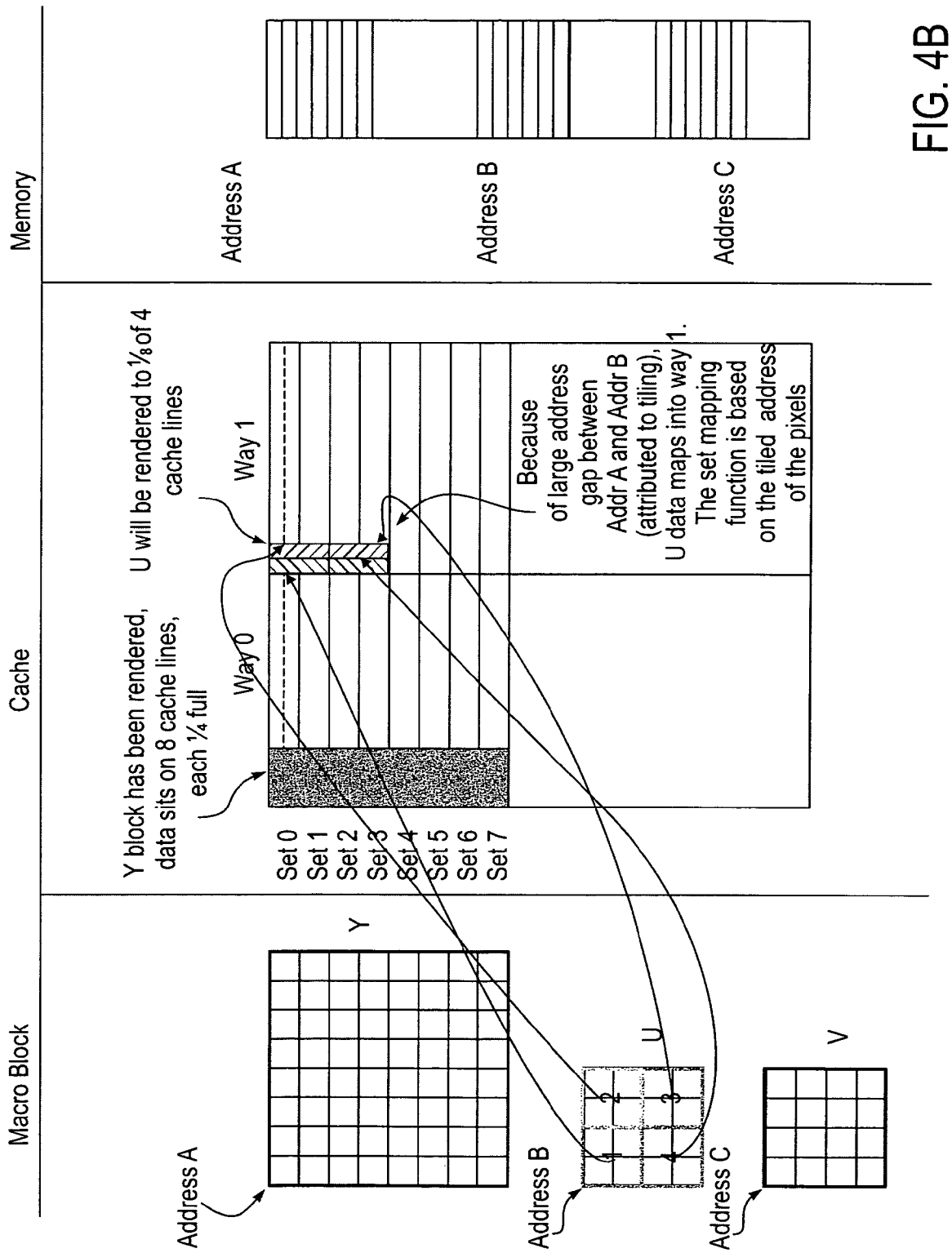
Figure 4C:
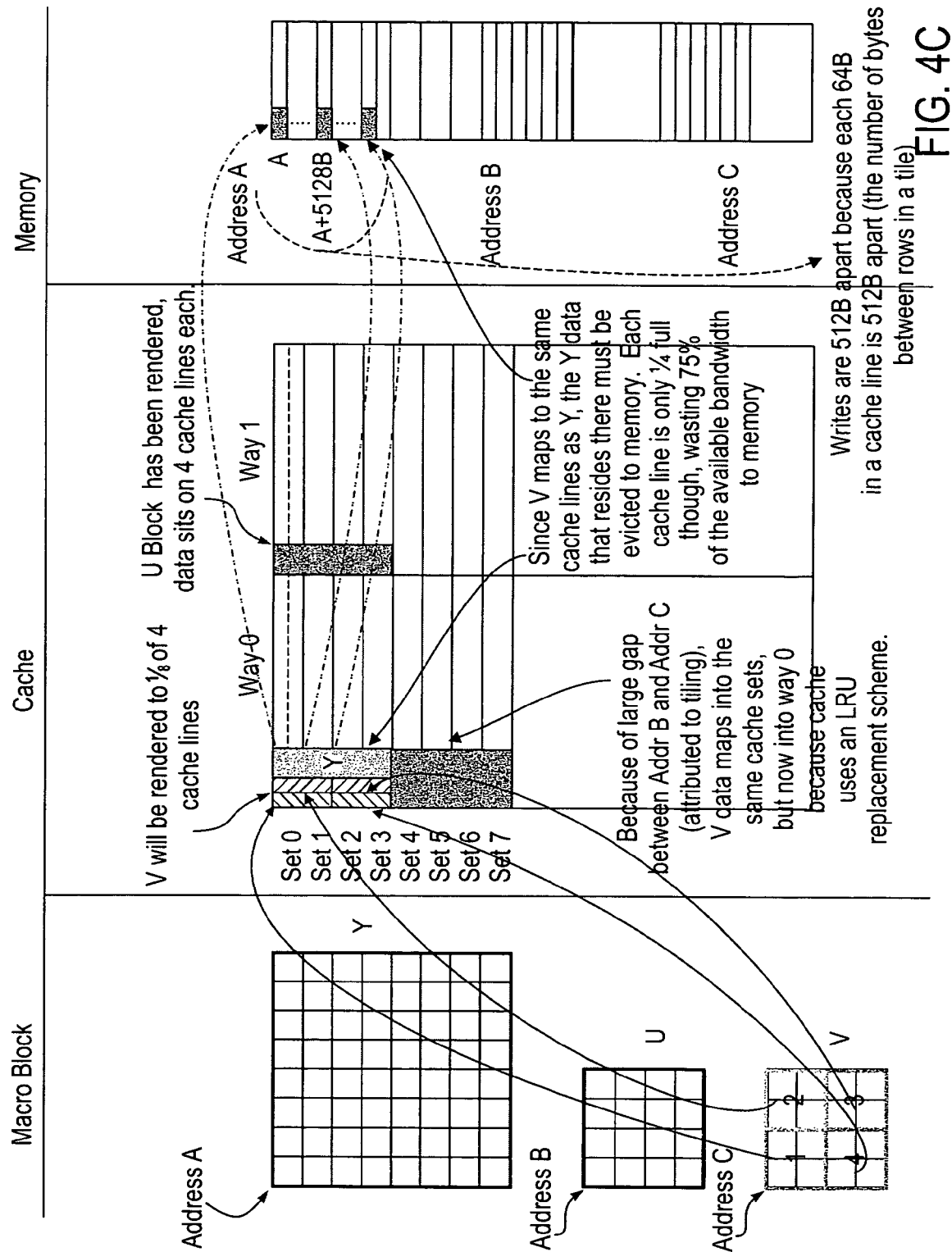

Operation proceeds with the Y block being rendered first, and the mapping function causing the Y block data to be spread on eight contiguous cache lines numbered Set 0-set 7, Way 0. The Y block is rendered and written in the order of the numbers shown, until the entire Y block has been written into the cache, as shown in FIG. 4B. Next, the U block is rendered until it has been written to the cache, as shown in FIG. 4B. The U block, being one-fourth the size of a Y block in this embodiment, is stored in one-eighth of four contiguous cache lines, as shown. These cache lines are Set 0-Set 3, Way 1. It is the cache set mapping function that determines which cache set addresses will be used to store the pixels of a given block (that are identified by their memory addresses).

In a typical mapping function, since the V and U blocks are associated with the same combination block, the V block is mapped into the same cache sets as the U block, but now into Way 0 rather than Way 1. That may be because the cache uses a least recently used replacement (LRU) scheme. However, since the V block maps to the same cache lines as the corresponding Y block of this combination, the Y image pixel data that resides in those cache lines (in this case Set 0-Set 3) is evicted to memory before the V data may be written therein. Since each cache line, as shown, is only one quarter full, seventy-five percent of the available bandwidth to memory has in effect been wasted. This thrashing of the cache, where a V block will cause an eviction of the Y block for the same combination, continues for each macro block, thereby taking valuable time from the overall interval allowed to render and display a given frame.

Figure 5:
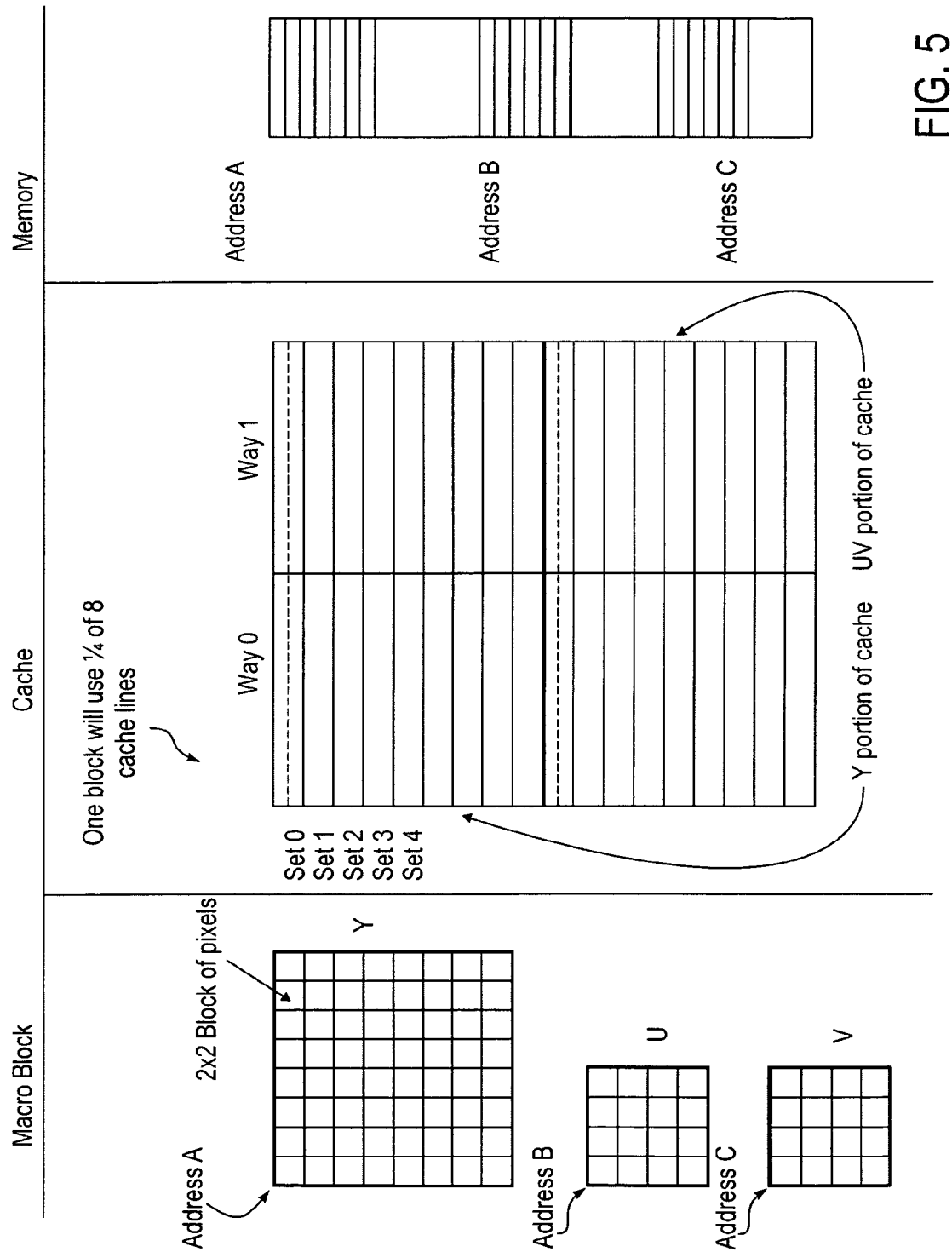
FIG. 5 shows how the render cache may be logically partitioned to improve its efficiency.

According to an embodiment of the invention, the render cache 104 is logically partitioned into a contiguous portion that stores first component pixel blocks, but not any second component pixel blocks, and another contiguous portion to store the second component pixel blocks, but not any first component pixel blocks. Thus, for the example of YUV color space, FIG. 5 illustrates how the render cache is partitioned into a Y portion and a UV portion. In this example, the cache is two-way set associative, where the contiguous portions have respective groups of cache set addresses that do not overlap and are associated with two "ways" of the cache. This logical partitioning of the cache may be achieved by designing or configuring the cache set address mapping function so that predefined virtual addresses that refer to parts of combination pixel blocks (macro blocks) are translated into the appropriate cache set addresses as will be explained below.

Figure 6:
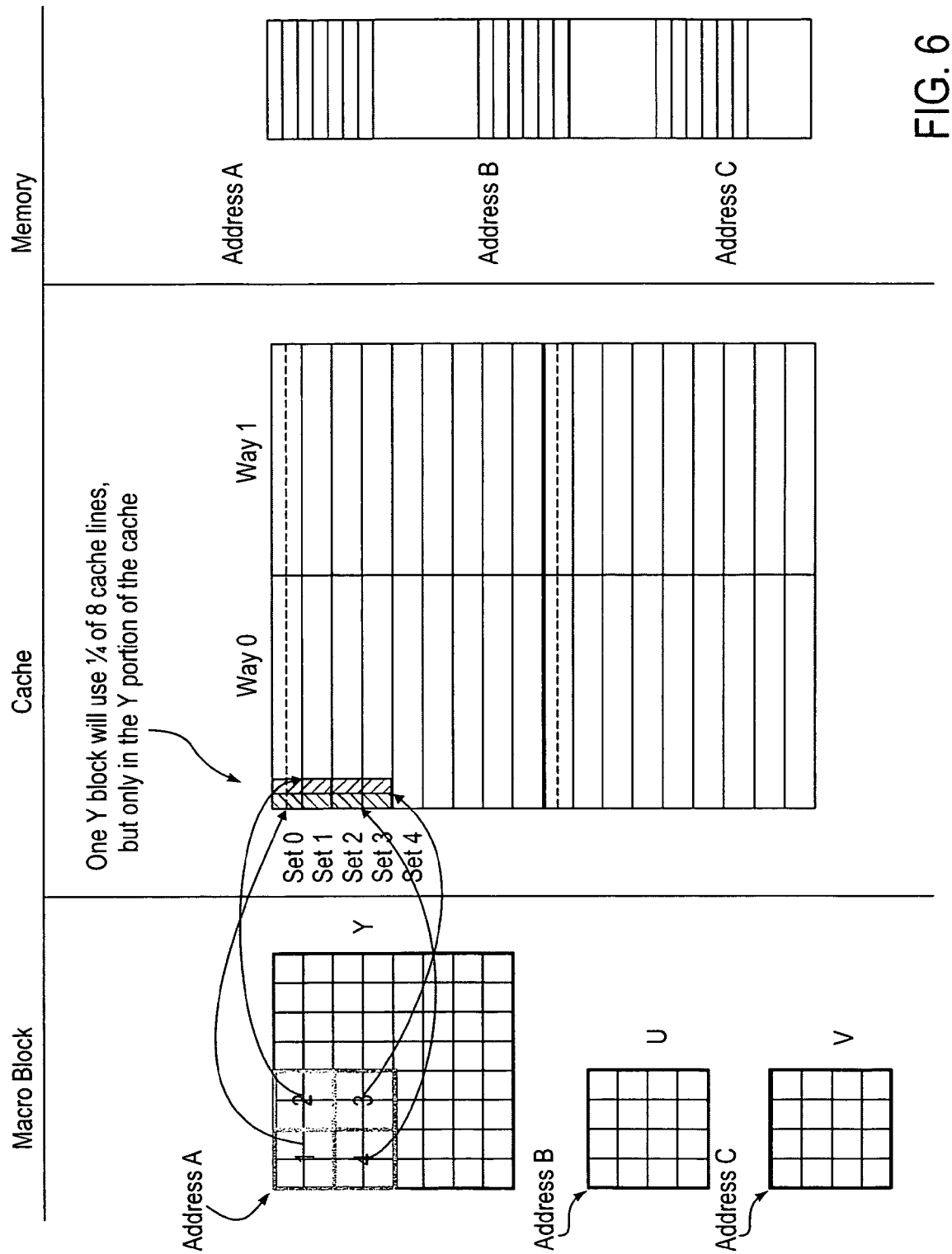
FIG. 6 depicts the placement of a Y block in the partitioned render cache.
Figure 7:
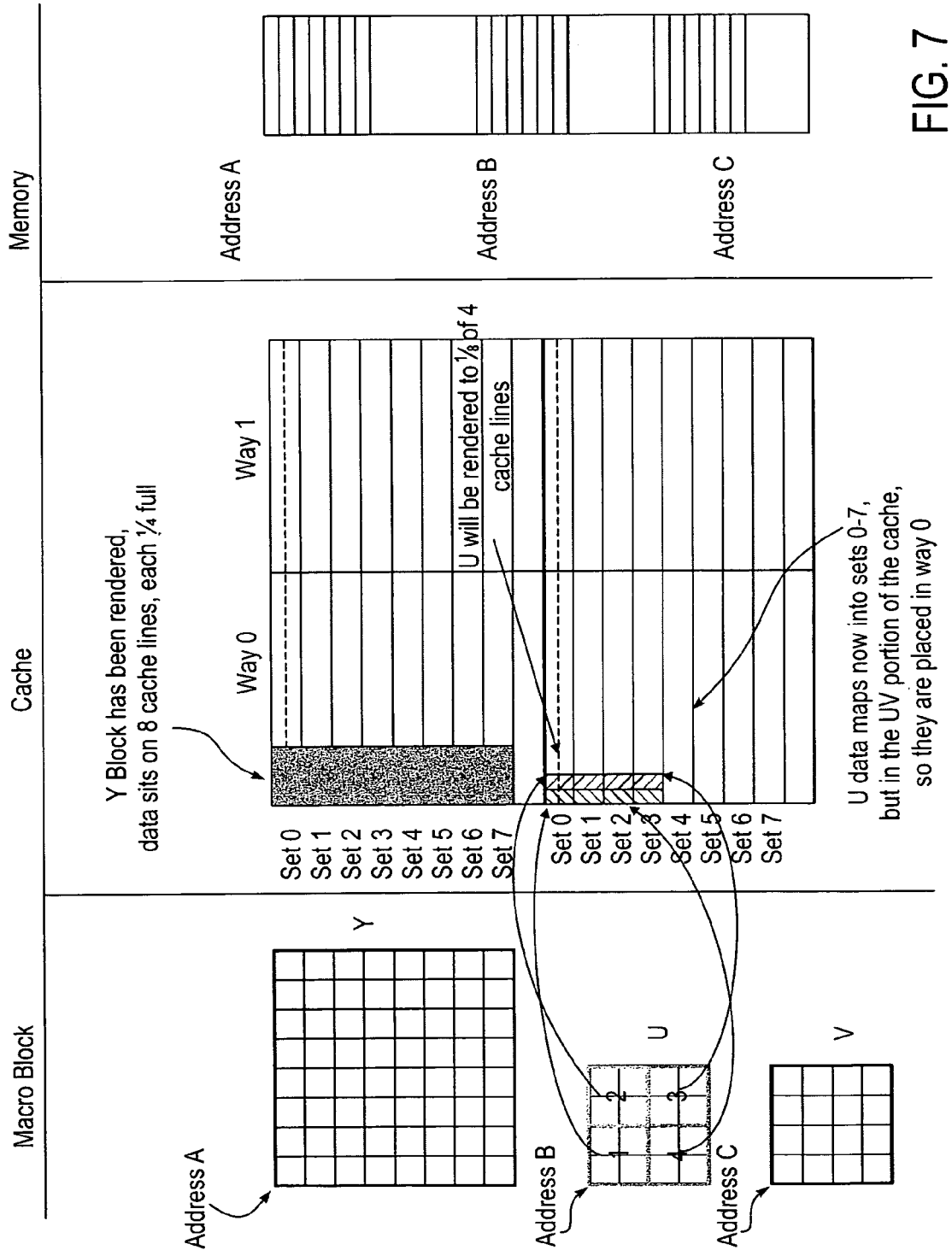
FIG. 7 depicts the placement of a U block in the render cache.
Figure 8:
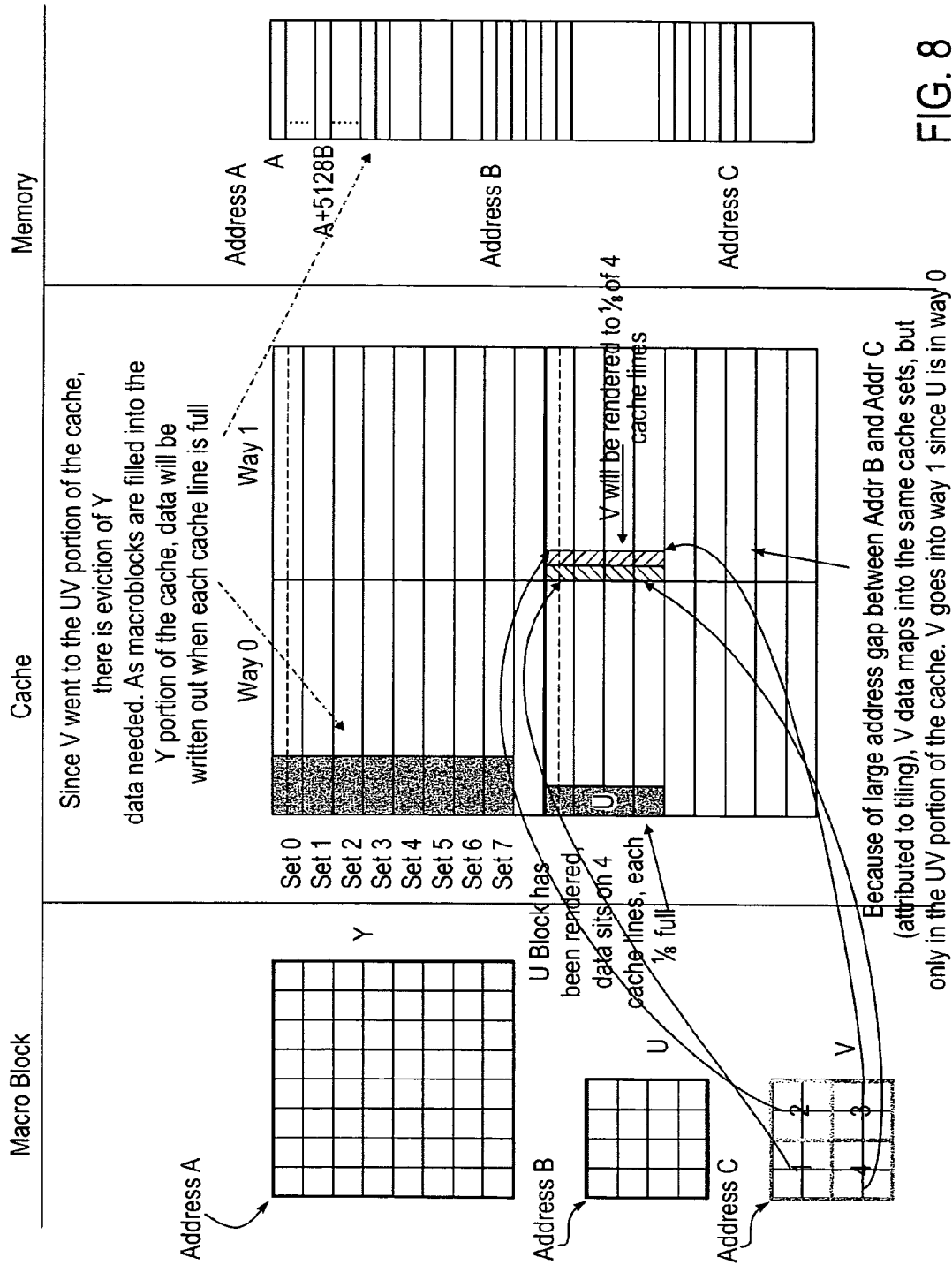
FIG. 8 shows the placement of a V block in the render cache.

Turning now to FIG. 6, operation of the logically partitioned cache is illustrated for a single pixel macro block consisting of a single Y component, a single U component, and a single V component. As illustrated, the single Y block uses one quarter of eight cache lines, but only in the Y portion of the cache. Operation continues, as depicted in FIG. 7, with the U block being rendered and written to one-eighth of four cache lines, albeit now the U data is mapped into Set 0-Set 3 in the UV portion of the cache. Similarly, the Y block will be rendered and written to also one-eighth of four cache lines that are in the UV portion. In this particular case, these are the same cache lines that the corresponding U block was mapped into. Note that in the case of the two-way set associative cache shown here, the U and V blocks occupy different ways of the cache. Finally, it should be noted that since the V block and the U block were written to a different portion of the cache than the Y block, there is no eviction of the Y data in this case, and the entire macro block is advantageously written to the cache without any evictions. This is depicted in FIG. 8.

Figure 9:
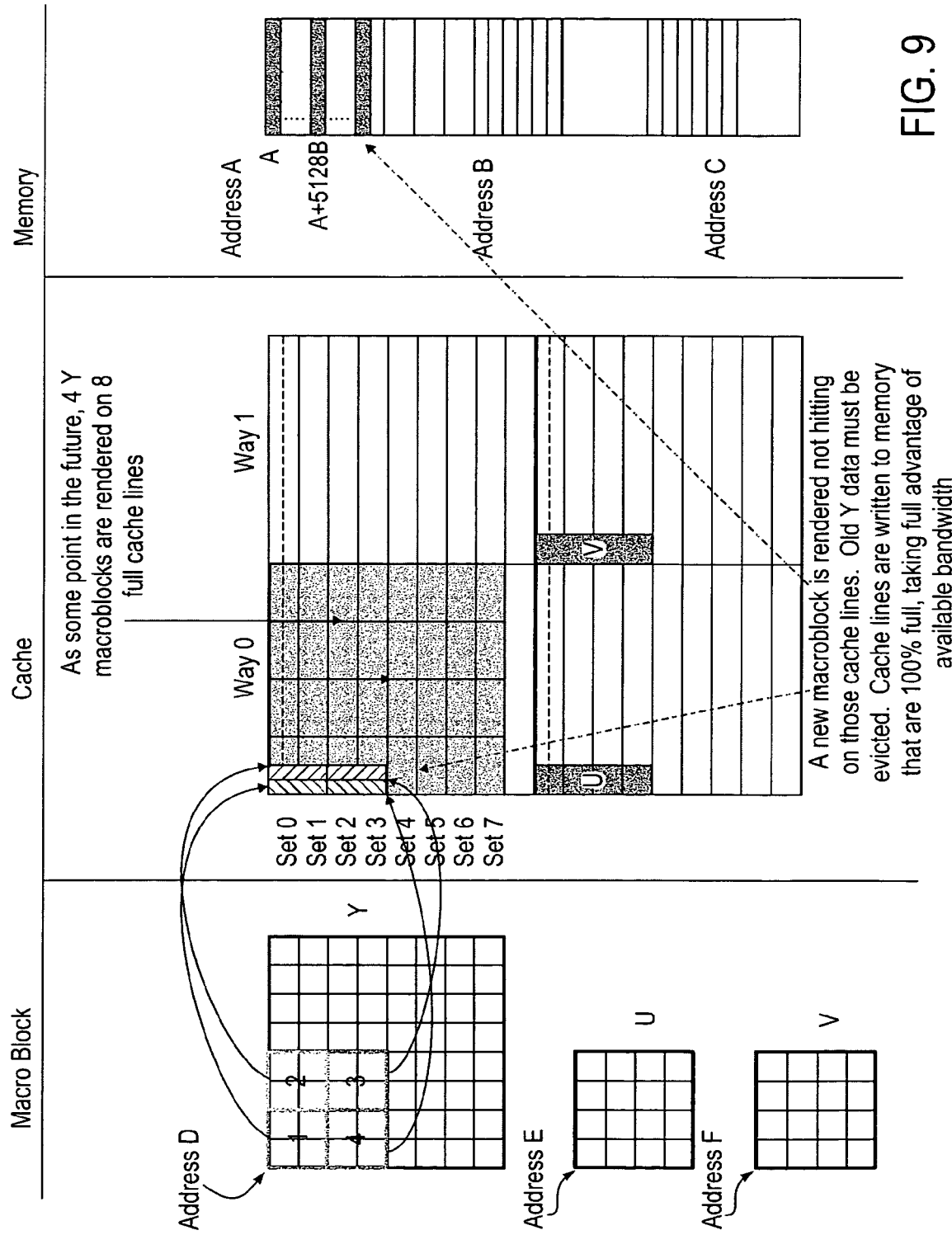
FIG. 9 illustrates how a cache line that is full of Y blocks is evicted.

Turning now to FIG. 9, this figure further illustrates the improvement in efficiency obtained by partitioning the render cache into the different contiguous portions. After the initial YUV pixel macro block (addresses A, B, and C) has been written into the cache, followed by three more Y macro blocks that are written into cache lines Set 0-Set 7 as shown, a further macro block is generated having addresses D, E, and F. By virtue of the cache set address mapping function, address D does not hit on any unused cache lines, but rather is mapped onto Set 0-Set 7, Way 0. This mapping causes a "cache miss", such that the existing Y image data stored in the eight cache lines Set 0-Set 7 is evicted, prior to writing the new Y block (address D). However, in this case, the cache lines being evicted are 100% full, thereby taking full advantage of the available bandwidth between the cache and memory.

Interlaced Image Embodiment

Another embodiment of the invention is directed at interlaced images and in particular interlaced video. In the latter case, a video frame may be divided into two fields, one having pixels of odd numbered display lines and the other pixels of even numbered display lines. In general, processing of interlaced image data generates a sequence of pixel blocks that are in a first but not a second field, and then generates a sequence of pixel blocks that are in the second but not the first field. For example, a sequence forming the entire odd field of a video frame may be generated, followed by a sequence forming the entire even field of the same frame.

According to an embodiment of the invention, the render cache of a graphics controller is logically partitioned so that the pixel blocks generated by the video engine during a given field are stored only in contiguous cache lines. In other words, while generating a group of odd field pixel blocks, rather than reserve or skip a cache line for even field pixel blocks, all pixels of that group are stored in contiguous cache lines. An example of such an embodiment is depicted in FIG. 10.

Figure 10:
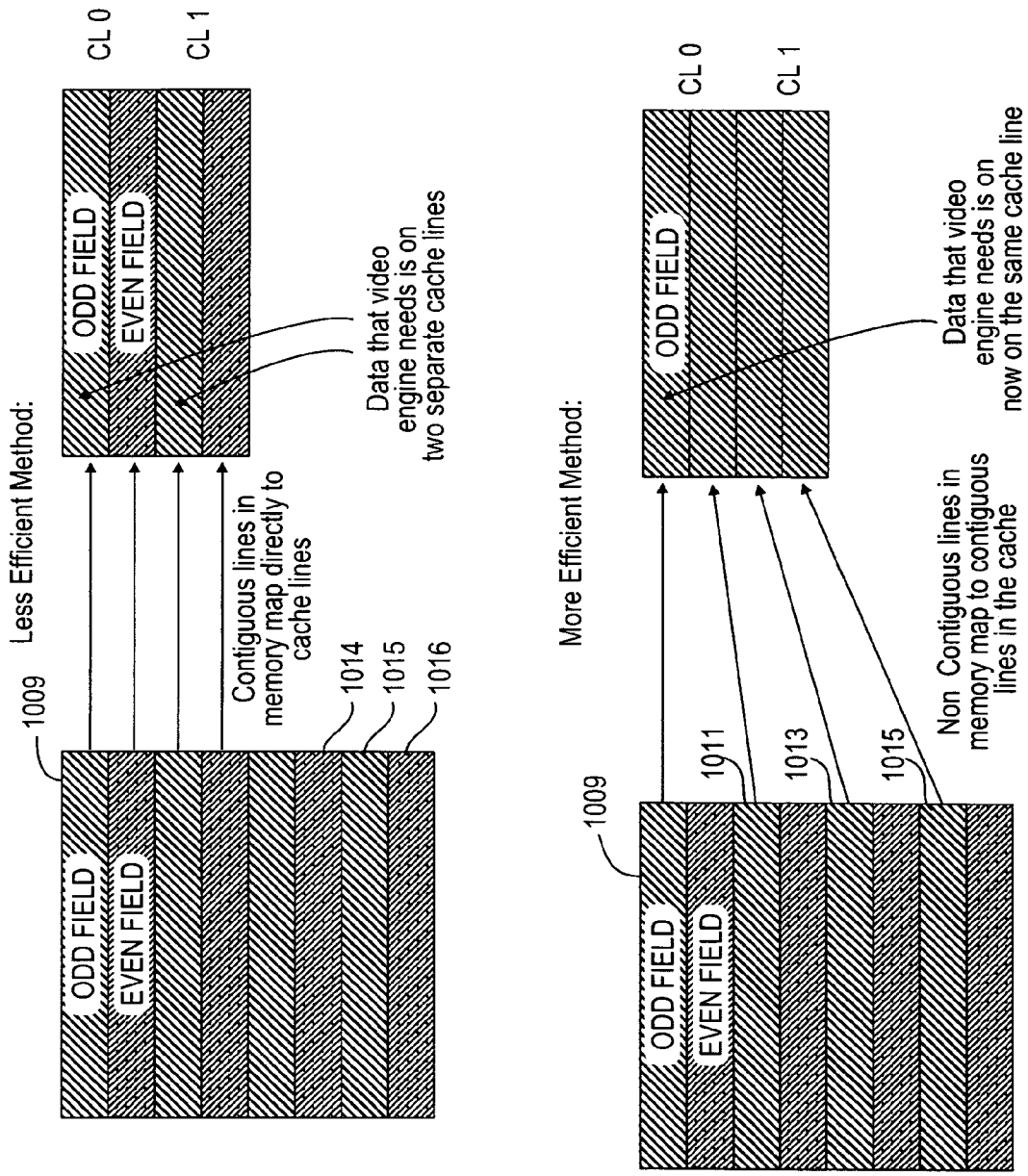
FIG. 10 depicts another embodiment of the invention, suitable for interlaced image processing.

Turning now to FIG. 10, at the left side of the figure are the even and odd fields of pixel blocks produced by the video engine that are to be written to memory via the render cache. The left side shows how the pixels of each field are to be stored in memory, in alternating lines where the pixels in each line 1009-1015 have sequential virtual addresses. The render cache is logically partitioned, in this embodiment, so that a sequence of odd field pixel blocks (e.g., lines 1009, 1011, 1013, 1015) are written to multiple contiguous cache lines (here, cache lines 0 and 1) to which no even field pixel blocks are written. In addition, the logical partitioning is such that when the sequence of even field blocks are to be written, they are also written to contiguous cache lines. This is believed to yield more efficient use of the cache, for example, with respect to even and odd fields that have an organization referred to as tiled Y in main memory. A less efficient method for using the render cache (which is also shown in FIG. 10) would be to partition the cache in the same way as memory such that adjacent lines of pixel storage space in memory would map directly to contiguous cache lines, that is those which have sequential cache set addresses such as cache lines 0 and 1 shown.

It should be noted that the logical partitioning, and hence the cache set address mapping function, may be fixed at the time of manufacture of the graphics controller or it may be programmable, to suit different types of image data organizations in memory (e.g., tiled X; tiled Y). This organization or tiling of the image data in memory may be defined by the operating system, and the set address mapping function is then determined based on this organization and is not altered by application software such as a DVD player.

The invention is not limited to the specific embodiments described above. Although the above examples are in the context of a two-way set associative cache, the modification to the cache set address mapping function (to logically partition the cache) may, more generally, be applied to M-way set associative caches where M is any positive integer. In addition, the combination pixel blocks were defined in the YUV color space, but other types of combination blocks may alternatively be defined, such as red, green, and blue (RGB). The embodiments described above are in the context of a system where the graphics controller writes the rendered image data to main memory. Another embodiment of the invention lies in a system where the graphics controller writes to dedicated video memory that is not shared by the host processor for storing software application programs. Yet another alternative may be to apply the logical partitioning described above to the digital processing of interlaced images in general, rather than to the more particular application of odd-even interlaced video. Finally, referring now to the graphics controller which may be integrated in a memory controller hub chip, another alternative there is to have a separate, graphics controller integrated circuit package or graphics accelerator circuit board that communicates with the memory controller hub chip. Accordingly, other embodiments are within the scope of the claims.

What is claimed is:

1. A method for image processing, comprising:
  processing image data to yield a plurality of first component pixel blocks and a plurality of second component pixel blocks, each of the first component pixel blocks being associated with a respective one of the second component pixel blocks to define a combination pixel block; and
  writing the plurality of first and second component pixel blocks to memory through a cache that is used as a write buffer and is logically partitioned into a contiguous portion to store first component pixel blocks and not any second component pixel blocks, and another contiguous portion to store second component pixels blocks and not any first component pixel blocks, wherein the cache is further logically partitioned into a contiguous portion for storing error data that results from a motion compensation algorithm and not for storing any of the first or second component pixel blocks, wherein the error data is written to memory through the cache.

2. The method of claim 1 wherein the cache is M-way set associative and the contiguous portions have respective groups of sequential cache set addresses that do not overlap.

3. The method of claim 2 wherein M is two.

4. The method of claim 2 wherein the first component pixel blocks are Y pixel blocks, and the second component pixel blocks are U and V blocks.

5. The method of claim 1 wherein the first component pixel blocks are Y pixel blocks, and the second component pixel blocks are U and V blocks.

6. The method of claim 1 wherein the Y pixel blocks are 16×16 and the U and V blocks are each 8×8.

7. The method of claim 1 wherein for a combination pixel block, its second component pixel blocks consist of a single U block and a single V block that are stored in the same cache set addresses but in different ways of the cache.

8. An integrated circuit comprising:
  a graphics controller to process video to yield combination pixel blocks each having a first component block and a second component block, the controller having a render cache logically partitioned into a first portion to store first component pixel blocks and not any second component pixel blocks, and a second portion to store second component pixels blocks and not any first component pixel blocks wherein the first and second portions have respective groups of sequential cache set addresses that do not overlap, wherein the cache is further logically partitioned into a contiguous portion for storing error data that results from a motion compensation algorithm and not for storing any of the first or second component pixel blocks, wherein the error data is written to memory through the cache.

9. The integrated circuit of claim 8 wherein the render cache is M-way set associative.

10. The integrated circuit of claim 9 wherein M is two.

11. A system comprising:
a processor;
a computer-readable medium to store an application program for execution by the processor; and
a graphics controller to process video requested by the application program, to yield combination pixel blocks each having a first component block and a second component block, the controller having a render cache logically partitioned into a contiguous portion to store first component pixel blocks and not any second component pixel blocks, and another contiguous portion to store second component pixels blocks and not any first component pixel blocks, wherein the cache is further logically partitioned into a contiguous portion for storing error data that results from a motion compensation algorithm and not for storing any of the first or second component pixel blocks, wherein the error data is written to memory through the cache.

12. The system of claim 11 wherein the render cache is M-way set associative and the contiguous portions have respective groups of sequential cache set addresses that do not overlap.

13. The system of claim 12 wherein M is two.

14. The system of claim 12 wherein the first component block is a single Y pixel block and the second component block is one of a single U pixel block and a single V pixel block.

15. The system of claim 11 wherein the first component block is a single Y pixel block and the second component block is one of a single U pixel block and a single V pixel block.

16. The system of claim 11 wherein the graphics controller has a hardware video engine that is to decode the image data using a motion compensation algorithm into said combination pixel blocks.

17. A method for image processing, comprising:
decoding encoded image data into (Y,U,V) color space to yield a plurality of Y pixel blocks, a plurality of U pixel blocks, and a plurality of V pixel blocks; and
writing the plurality of Y, U, and V blocks to memory through a cache that is used as a write buffer and is logically partitioned into a contiguous portion to store the plurality of Y blocks and not any of the U and V blocks, and another contiguous portion to store the plurality of U and V blocks and not any of the Y blocks;
logically partitioning the cache into a contiguous portion for storing error data that results from a motion compensation algorithm and not for storing any of the Y,U, and V pixel blocks; and
writing the error data to memory through the cache.

18. The method of claim 17 wherein the writing of the plurality of Y, U, and V blocks comprises:
translating virtual addresses of the Y, U, and V pixel blocks into cache set addresses.

19. The method of claim 18 wherein a predetermined bit is defined in a cache set address to indicate whether a pixel block to which the cache set address is assigned is one of a Y block and a U-V block.

20. The method of claim 17 wherein the decoding of the encoded image data yields a sequence of combination blocks, each combination block being a Y pixel block and corresponding U and V pixel blocks.

21. The method of claim 20 wherein each Y pixel block of a combination block is a square group of pixels that has four times as many pixels as the corresponding U pixel block, and four times as many pixels as the corresponding V pixel block.

22. A method for image processing, comprising:
decoding encoded image data to yield a sequence of even field pixel blocks and a sequence of odd field pixel blocks for interlaced video; and
writing the sequences of blocks to memory via a cache logically partitioned so that (1) the sequence of even field pixel blocks are written to a plurality of contiguous cache lines in the cache to which no odd field pixel blocks are written, and (2) the sequence of odd field pixel blocks are written to a different plurality of contiguous cache lines in the cache to which no even field pixel blocks are written;
logically partitioning the cache into a contiguous portion for storing error data that results from a motion compensation algorithm and not for storing any of the even or odd pixel blocks; and
writing the error data to memory through the cache.

23. The method of claim 22 wherein the sequences of even and odd field pixel blocks have virtual addresses that are tiled X.

24. The method of claim 23 wherein the sequences of even and odd field pixel blocks have virtual addresses that are tiled Y.

25. The method of claim 22 wherein the decoding implements a motion compensation algorithm for encoded video, the method further comprising:
logically partitioning the cache into a contiguous portion for storing error data that results from the motion compensation algorithm and not for storing any of the pixel blocks; and
writing the error data to memory through the cache.

26. A system comprising:
a host processor;
a computer-readable medium to store an application program for execution by the host processor; and
a graphics controller to process interlaced image data, requested by the application program, in odd and even video fields, the controller having a render cache logically partitioned so that all image data written into a cache line is on the same field, wherein the cache is further logically partitioned into a contiguous portion for storing error data that results from a motion compensation algorithm and not for storing any image data, wherein the error data is written to memory through the cache.

27. The system of claim 26 wherein graphics controller has a video engine with a hardware motion compensation unit that is to decode compressed video into said odd and even fields.

28. The system of claim 27 wherein the graphics controller is integrated in a memory controller hub chip.

29. An integrated circuit comprising:
a graphics controller to process an interlaced image with at least two fields, the controller having a render cache logically partitioned into a section wherein all pixel data written into each cache line of the section to render the interlaced image is on the same field, wherein the cache is further logically partitioned into a contiguous portion for storing error data that results from a motion compensation algorithm and not for storing any pixel data, wherein the error data is written to memory through the cache.

30. The integrated circuit of claim 29 wherein the graphics controller has a video engine with a hardware motion compensation unit that is to decode compressed video into said two fields.

31. The integrated circuit of claim 30 wherein the graphics controller has a display engine that is to access the interlaced image from computer readable memory.

32. An integrated circuit comprising:
a graphics controller to process an interlaced image having at least two fields, the controller having a render cache logically partitioned so that all pixel data written into each of a plurality of contiguous cache lines for the interlaced image is on the same field, wherein the cache is further logically partitioned into a contiguous portion for storing error data that results from a motion compensation algorithm and not for storing any pixel data, wherein the error data is written to memory through the cache.

33. The integrated circuit of claim 32 wherein the render cache is M-way set associative and the plurality contiguous cache lines have sequential cache set addresses.

34. The integrated circuit of claim 33 wherein M is two, with each cache set address referring to two cache lines in separate ways of the render cache.

35. A system comprising:
a processor;
a computer-readable medium to store an application program for execution by the processor; and
a graphics controller to process pixel data of a frame, requested by the application program, in odd and even video fields, the controller having a render cache logically partitioned so that all pixel data written into each of a plurality of contiguous cache lines for said frame is on the same field, wherein the cache is further logically partitioned into a contiguous portion for storing error data that results from a motion compensation algorithm and not for storing any pixel data, wherein the error data is written to memory through the cache.

36. The system of claim 35 wherein the render cache is M-way set associative and the plurality contiguous cache lines have sequential cache set addresses.

37. The system of claim 36 wherein M is two, with each cache set address referring to two cache lines in separate ways of the render cache.

38. The system of claim 35 wherein the graphics controller is integrated in a memory controller hub chip.

* * * * *